US011269961B2

(12) United States Patent
De Barros et al.

(10) Patent No.: US 11,269,961 B2
(45) Date of Patent: Mar. 8, 2022

(54) SYSTEMS AND METHODS FOR APP QUERY DRIVEN RESULTS

(71) Applicant: Microsoft Technology Licensing, LLC, Redmond, WA (US)

(72) Inventors: Marcelo M. De Barros, Bellevue, WA (US); Siddharth S. Shenoy, Bellevue, WA (US); Aman Singhal, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 515 days.

(21) Appl. No.: 15/449,574

(22) Filed: Mar. 3, 2017

(65) Prior Publication Data

US 2018/0121543 A1    May 3, 2018

Related U.S. Application Data

(60) Provisional application No. 62/414,415, filed on Oct. 28, 2016.

(51) Int. Cl.
    *G06F 16/00*     (2019.01)
    *G06F 16/951*    (2019.01)
    *G06F 16/248*    (2019.01)
    *G06F 16/28*     (2019.01)
    *G06F 16/955*    (2019.01)

(52) U.S. Cl.
    CPC ......... *G06F 16/951* (2019.01); *G06F 16/248* (2019.01); *G06F 16/285* (2019.01); *G06F 16/9566* (2019.01)

(58) Field of Classification Search
    CPC combination set(s) only.
    See application file for complete search history.

(56) References Cited

U.S. PATENT DOCUMENTS 7,680,775 B2    3/2010 Levin et al.
7,779,408 B1 *  8/2010 Papineau ............... H04W 4/00
                                                     717/178

(Continued)

FOREIGN PATENT DOCUMENTS

CN    102419769 A    4/2012
CN    103049468 A    4/2013

(Continued)

OTHER PUBLICATIONS

"First Office Action and Search Report Issued in Chinese Application No. 201480042887.9", dated Jun. 5, 2018, 10 Pages.

(Continued)

*Primary Examiner* — Noosha Arjomandi

(57) ABSTRACT

System and methods for presenting users with different App download options in response to certain search queries. In aspects, when a user enters a search query that does not explicitly request an App, systems and methods described herein analyze the results of the search and determine whether the request is an implicit request for Apps. As a result, relevant Apps are identified and presented for download. Other aspects of the present disclosure relate to analyzing and identifying URLs of companies and developers of Apps. Once analyzed and identified, embodiments relate to associating the appropriate URLs with one or more Apps.

20 Claims, 10 Drawing Sheets

(56) References Cited

U.S. PATENT DOCUMENTS

| | | | |
|---|---|---|---|
| 7,962,464 B1* | 6/2011 | Brette | G06F 16/9535 707/706 |
| 8,041,733 B2 | 10/2011 | Rouhani-Kalleh | |
| 8,745,617 B1* | 6/2014 | Stekkelpak | G06F 8/61 717/178 |
| 8,762,360 B2 | 6/2014 | Jiang et al. | |
| 8,825,663 B2 | 9/2014 | Mahaniok et al. | |
| 9,020,925 B2 | 4/2015 | Li et al. | |
| 9,256,697 B2* | 2/2016 | Jiang | G06F 16/9558 |
| 9,256,761 B1* | 2/2016 | Sahu | G06F 16/90335 |
| 9,405,832 B2 | 8/2016 | Edwards et al. | |
| 9,645,797 B2* | 5/2017 | Savliwala | G06F 16/22 |
| 9,984,125 B1* | 5/2018 | Smith | G06F 16/972 |
| 10,387,889 B1* | 8/2019 | Hanna | G06Q 30/018 |
| 2009/0254512 A1* | 10/2009 | Broder | G06Q 30/02 |
| 2010/0030734 A1* | 2/2010 | Chunilal | G06Q 10/10 707/770 |
| 2010/0306249 A1* | 12/2010 | Hill | G06Q 50/01 707/769 |
| 2010/0332493 A1 | 12/2010 | Haas et al. | |
| 2011/0307482 A1 | 12/2011 | Radlinski et al. | |
| 2011/0314004 A1* | 12/2011 | Mehta | G06F 16/40 707/723 |
| 2011/0314018 A1 | 12/2011 | Bieniosek et al. | |
| 2012/0109902 A1* | 5/2012 | Rozensztejn | H04W 4/60 707/689 |
| 2012/0124028 A1 | 5/2012 | Tullis et al. | |
| 2012/0124061 A1 | 5/2012 | Macbeth et al. | |
| 2012/0124062 A1* | 5/2012 | Macbeth | H04L 67/16 707/749 |
| 2012/0191694 A1 | 7/2012 | Gardiol et al. | |
| 2012/0284247 A1 | 11/2012 | Jiang et al. | |
| 2012/0284256 A1* | 11/2012 | Mahajan | G06F 16/9537 707/722 |
| 2012/0317109 A1* | 12/2012 | Richter | G06F 16/24578 707/734 |
| 2013/0304718 A1 | 11/2013 | Sadhukha et al. | |
| 2013/0325892 A1* | 12/2013 | Edwards | G06F 16/951 707/769 |
| 2014/0006409 A1 | 1/2014 | Prosnitz et al. | |
| 2014/0059635 A1* | 2/2014 | Sirpal | H04N 21/40 725/131 |
| 2014/0068593 A1* | 3/2014 | McErlane | G06F 9/54 717/171 |
| 2014/0250098 A1 | 9/2014 | Kasterstein et al. | |
| 2014/0324741 A1* | 10/2014 | Stewart | G06N 20/00 706/12 |
| 2015/0039580 A1* | 2/2015 | Subhedar | G06Q 10/02 707/706 |
| 2015/0074129 A1* | 3/2015 | Friedrich | G06F 16/21 707/756 |
| 2015/0370812 A1* | 12/2015 | Lee | G06F 16/951 707/711 |
| 2016/0055183 A1* | 2/2016 | Fiero | H04N 21/23109 707/803 |
| 2016/0085514 A1* | 3/2016 | Savliwala | G06F 3/0482 705/14.69 |
| 2016/0085516 A1* | 3/2016 | Ben-Tzur | G06F 16/972 717/109 |
| 2016/0179956 A1* | 6/2016 | Sogani | G06Q 30/0251 707/722 |
| 2016/0188130 A1* | 6/2016 | Harris | H04L 67/02 715/738 |
| 2016/0188602 A1* | 6/2016 | Glover | G06Q 50/01 707/749 |
| 2016/0335356 A1* | 11/2016 | Desineni | G06F 3/04847 |
| 2017/0046741 A1* | 2/2017 | Hunter | G06Q 30/0275 |
| 2017/0083303 A1* | 3/2017 | Meredith | H04L 67/34 |
| 2017/0083527 A1* | 3/2017 | Kumar | G06F 16/957 |
| 2017/0116692 A1* | 4/2017 | Liggett | G06F 40/166 |
| 2017/0132294 A1* | 5/2017 | Cooper | G06F 16/248 |
| 2017/0187838 A1* | 6/2017 | Sankaranarasimhan | H04L 63/00 |
| 2017/0220680 A1* | 8/2017 | Shattuck | G06F 16/951 |
| 2017/0353603 A1* | 12/2017 | Grunewald | H04W 4/60 |
| 2018/0121543 A1* | 5/2018 | De Barros | G06F 16/285 |

FOREIGN PATENT DOCUMENTS

| | | |
|---|---|---|
| CN | 103218719 A | 7/2013 |
| CN | 103219005 A | 7/2013 |
| CN | 105095407 A | 11/2015 |
| WO | 2013116825 A1 | 8/2013 |

OTHER PUBLICATIONS

"International Preliminary Report on Patentability Issued In PCT Application No. PCT/US2014/048754", dated Nov. 2, 2015, 10 Pages.

"International Search Report and Written Opinion Issued in PCT Application No. PCT/US2017/057778", dated Dec. 11, 2017, 12 Pages.

Slawski, Bill, "Will Google Add Categories To Search Results, And Let You Edit Them?", http://www.seobythesea.com/2012/07/google-categories-search-results/, Published on: Jul. 4, 2012, 12 pages.

Eccleston, Kara, "An In-Depth Guide to Deep Linking and App Indexing", https://www.pmg.com/blog/an-in-depth-guide-to-deep-linking-and-app-indexing/, Published on: Jul. 16, 2016, 13 pages.

Randolph, Bridget, "How to Get Your App Content Indexed by Google", https://moz.com/blog/how-to-get-your-app-content-indexed-by-google. Published on: Oct. 26, 2015, 22 pages.

Redth, "What are App Links?", http://redth.codes/what-are-app-links/, Published on: May 8, 2014, 6 pages.

Schwartz, Barry, "Google Testing Grouping Search Results By Category", http://searchengineland.com/google-testing-grouping-search-results-by-category-10997, Published on: Apr. 18, 2007, 6 pages.

Hines, Kristi, "40 Advanced and Alternative Search Engines", https://blog.kissmetrics.com/alternative-search-engines/, Retrieved on: Oct. 25, 2016, 1 pages.

Gui, et al., "A Contextualized and Personalized Approach for Mobile Search", In International Conference on Advanced Information Networking and Applications Workshops, May 26, 2009, 6 pages, http://ieeexplore.IEEE.org/stamp/stamp.jsp?tp=&arnumber=5136776.

PCT 2nd Written Opinion Issued in PCT Application No. PCT/US2014/048754, dated Jun. 23, 2015, 9 Pages.

PCT International Search Report and Written Opinion received for PCT Patent Application No. PCT/US2014/048754, dated Oct. 28, 2014, 14 Pages.

Strohmaier, et al., "Intentional Query Suggestion: Making User Goals More Explicit During Search", In Proceedings of the Workshop on Web Search Click Data, Feb. 9, 2009, 7 pages, http://markusstrohmaier.info/documents/2009_WSCD09_1ntentional-Query-Suggestion.pdf.

U.S. Appl. No. 13/956,142, Amendment and Response filed Oct. 8, 2015, 11 pages.

U.S. Appl. No. 13/956,142, Amendment and Response filed Jun. 24, 2016, 11 pages.

U.S. Appl. No. 13/956,142, Office Action dated Oct. 6, 2016, 15 pages.

U.S. Appl. No. 13/956,142, Office Action dated Mar. 2, 2016, 15 pages.

U.S. Appl. No. 13/956,142, Office Action dated Jul. 8, 2015, 13 pages.

Yan, et al., "Appjoy: Personalized Mobile Application Discovery", In Proceedings of the 9th International Conference on Mobile Systems, Applications, and Services, Jun. 28, 2011, pp. 113-126.

* cited by examiner

SYSTEMS AND METHODS FOR APP QUERY DRIVEN RESULTS

CROSS-REFERENCE TO RELATED APPLICATION

This application claims priority to U.S. Provisional Application No. 62/414,415, entitled "Systems and Methods for App Query Driven Results," filed on Oct. 28, 2016, the entire disclosure of which is hereby incorporated by reference in its entirety.

BACKGROUND

Computer interaction is focused on using Apps. Apps are specific applications made by different businesses or other entities in order to provide users quick and easy interactive capabilities with their business and the services provided by those businesses. Once an App is located, a user typically downloads the App and installs the same. Once installed, the user is able to launch the App and interact with the business in some way. Unfortunately, in some cases, when users search for specific Apps, they do not include the correct language in the search box of their browser. As a result, users are not presented with the various App download options that would help them in the quest to interact with a specific company or business.

It is with respect to these and other general considerations that embodiments have been described. Also, although relatively specific problems have been discussed, it should be understood that the embodiments should not be limited to solving the specific problems identified in the background.

SUMMARY

The disclosure generally relates to a system and methods for presenting users with different App download options in response to certain search queries. In aspects, when a user enters a search query that does not explicitly request an App, systems and methods described herein analyze the results of the search and determine that the request is an implicit request for Apps. As a result, relevant Apps are identified and presented for download.

More specifically, the embodiments described herein are directed to associating an App with a website of the business entity or developer that created the App. Thus, when a user performs a search for a specific topic, a webpage associated with the topic, as well as one or more Apps for that topic, may be returned and subsequently displayed to the user.

As will be explained in detail below, each App may include an App identifier or App ID. The App ID is associated with a website of the business entity or developer that created the App. When a search result includes a website from a particular business entity or developer, a determination is made as to whether the uniform resource locator (URL) of the website is stamped with, or is otherwise associated with, one or more App IDs. If so, the App associated with the App ID is returned as part of the search.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As described above, the disclosure generally relates to a system and methods for presenting users with different App download options in response to certain search queries. In aspects, when a user enters a search query that does not explicitly request an App, systems and methods described herein analyze the results of the search and determine whether the request is an implicit request for Apps. When it is determined that the request is an implicit request for Apps, relevant Apps are identified and presented for download.

Other aspects of the present disclosure relate to analyzing and identifying URLs of companies and developers of Apps. Once analyzed and identified, embodiments relate to associating the appropriate URLs with one or more Apps. Other aspects of the disclosure relate to analyzing a user's search query and/or search results to determine whether or not to present the user with Apps for download. In embodiments, one method of determining whether or not to present the user with Apps for download is based on an analysis of the search results, and determining if the results include a requisite number of websites or URLs that have been predetermined as having associated Apps. If the requisite number of URLs have associated Apps, then embodiments will also display download options for those Apps.

In other aspects, another search may be performed. This subsequent search may be an explicit App search. The results of this search may yield Apps and/or download options for the various Apps. Other aspects of the present invention relate to resolving conflicts associated with a URL or website as having two or more associated Apps. Embodiments of the present invention determine the correct App to display and make available for download.

Figure 1:
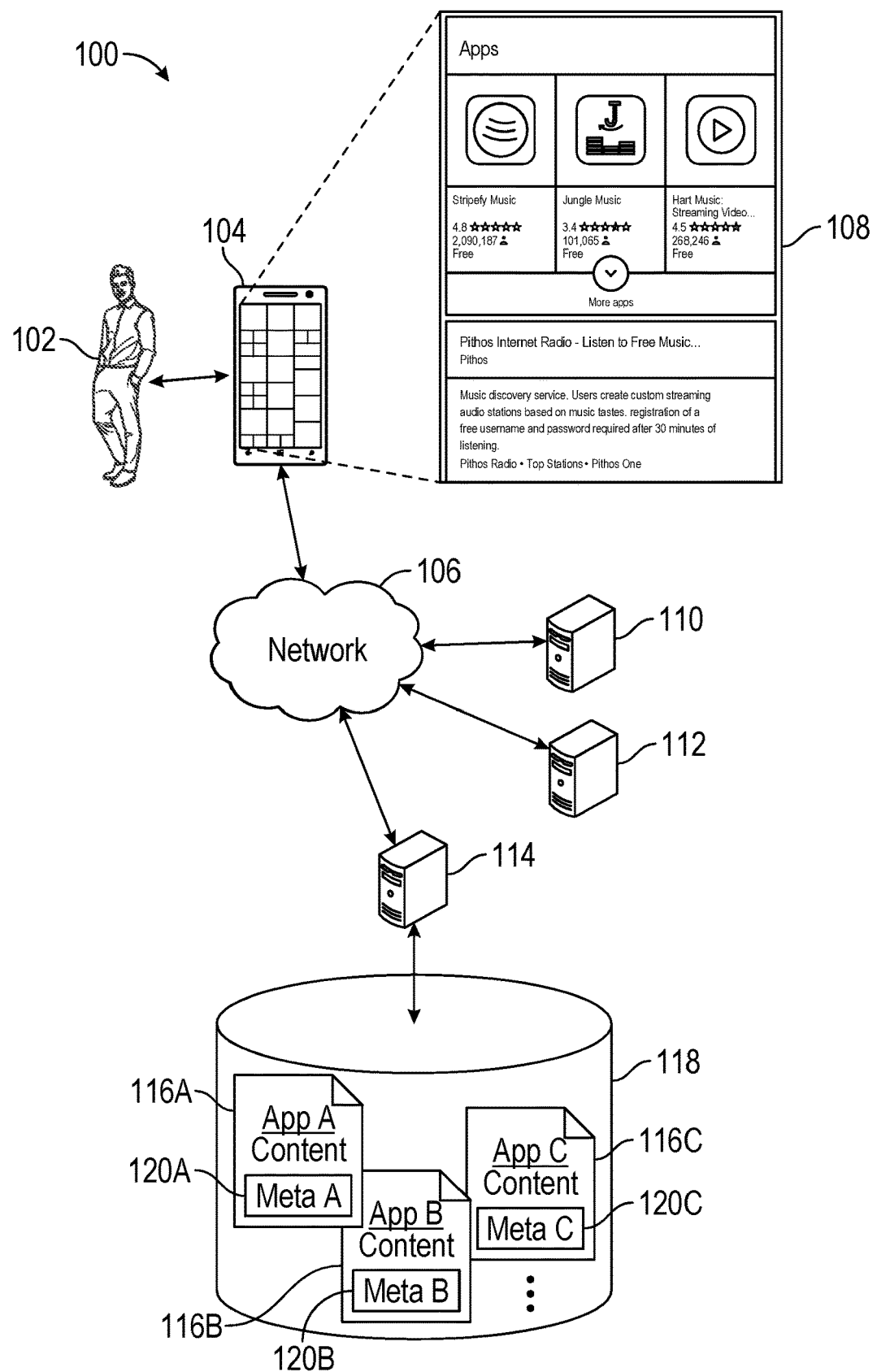
FIG. 1 illustrates a system for presenting Apps for download in response to an implicit App search or request.

FIG. 1 illustrates a system 100 for determining which Apps are to be presented to users in response to a received search request, according to an example embodiment. As illustrated, system 100 may comprise one or more users, e.g., user 102, using one or more client computing devices, e.g., computing device 104. The computing device 104 executes a client version of a browser, and a browser search engine, such as BING®, to access information over the Internet, illustrated as network 106.

For example, the user 102 may input a search request into a user interface of a browser search engine executing on the computing device 104 to obtain information about which Apps are available and are related to a specific subject. As a results of the search, the browser may present or download App information 108. In some examples, the browser search engine may communicate via network 106 with one or more servers 110, 112 and 114 to provide App information 108 to the user 102. Apps that are available for download, such as Apps 116A, 116B and 116C, are stored in a data store 118. Such App data stores are known and may include, as examples, iTunes®, Google Play®, etc. The data store 118 communicates, through server 114, to provide App information to requesting devices, such as computing device 104 at the request of user 102. The request may be implicit or explicit as described below.

As shown in FIG. 1, each App has metadata associated with it (e.g., Meta A 120A, Meta B 120B and Meta C 120C). In examples, the metadata associated with each App includes a name, an App ID, a category and a related website. For example, Willow is a fictitious company that, in this example, provides several different Apps related to home purchasing, home mortgages, homes for rent, etc. for download. Each of the Willow Apps has an associated name, App ID, category and related website. In some instances, each of the Willow Apps may be associated with the same website (e.g., www.willow.com). Other metadata may also be associated with each App.

Figure 2:
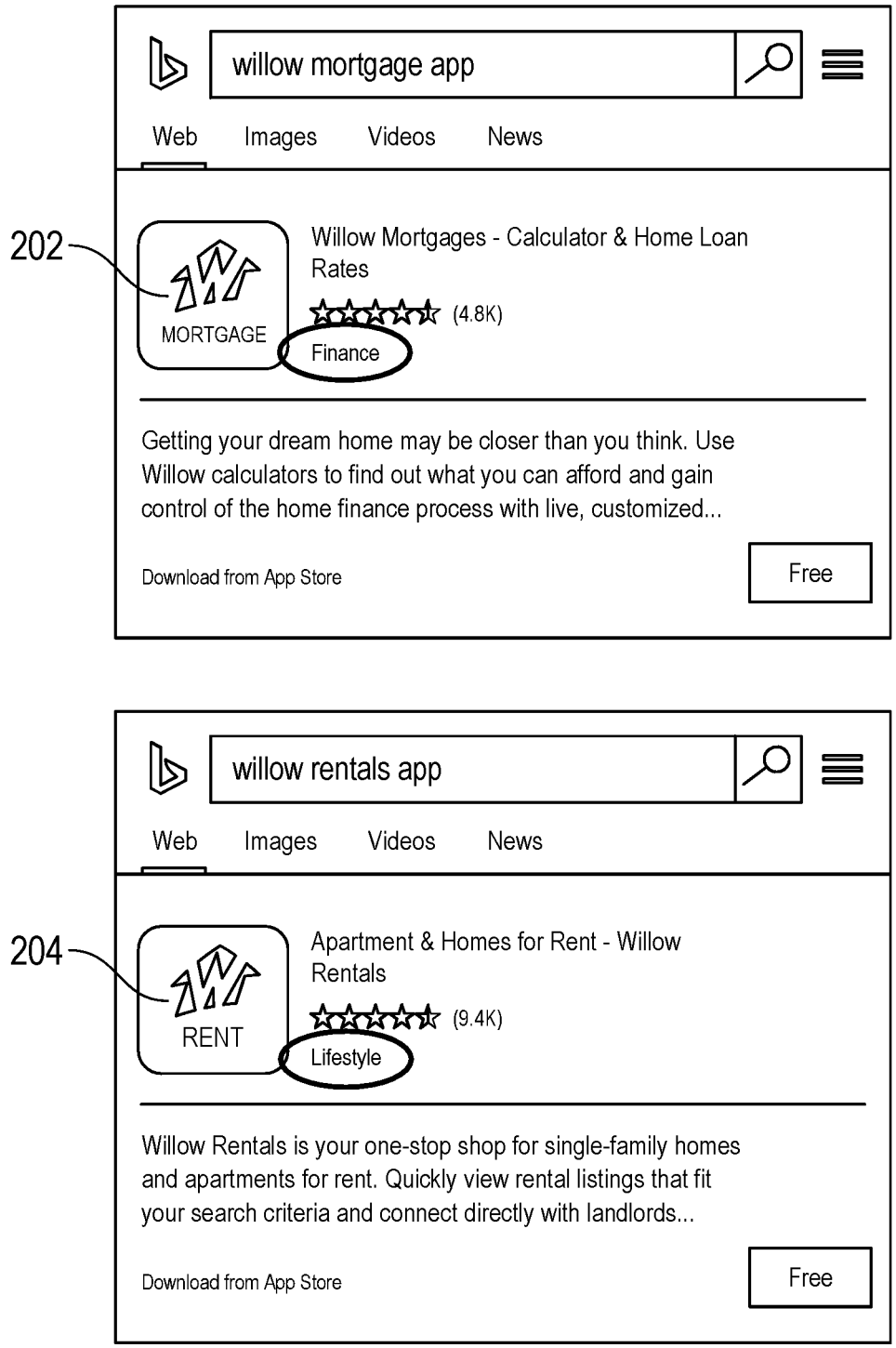
FIG. 2 illustrates two Apps for download from an example absolute URL.

Examples of two such Willow Apps are shown in FIG. 2, a Willow Mortgage App 202 and a Willow Rentals App 204. As shown, the Willow Mortgage App has a name, e.g., "Willow Mortgage" and a category, e.g., "Finance". The Willow Rentals App has a name, e.g., "Willow Rentals" and a category, e.g., "Lifestyle". Not shown, but those skilled in the art will appreciate, that each of the Willow Apps 202 and 204 in FIG. 2 have an associated website, e.g., "www.willow.com". Those skilled in the art will also appreciate that the website or URL that is specifically associated with each App may be more extensive and more specific to point to each specific App and/or the business entity or developer that created the App or is otherwise associated with the App. That said however, those skilled in the art will further appreciate that there is typically a root URL or "absolute" URL that is related to both Apps, e.g., "www.willow.com".

When stored in the data store, each App is assigned an App ID. The App ID is unique for each App in the data store 118. Although not shown in FIG. 2, one skilled in the art will appreciate such App ID assignments.

When a search is performed by user 102 on the computing device 104, the system 100 presents the user 102 with search results 108. The search results may include numerous entries, including, for example, a listing of different websites that are associated with the business entity, developer, or other entity. The websites may have associated Apps for download.

For example, if a search query of "home search" was provided in a user interface, the results may include the Willow website as a selectable option. The system 100, recognizing that the Willow has related Apps for potential download, may also present one or more of these Apps for download to the user 102. This presentation of Apps for download is done despite the fact that the query itself did not explicitly request an "App" or explicitly indicate an initial desire to "download" anything. As such, the App "request" is considered an "implicit request" for Apps.

In order to present one or more Apps for download, in response to such an implicit request, the system 100 utilizes numerous techniques. First, the system 100 stamps or otherwise associates the absolute URLs for those websites to the various Apps and App IDs that the business entity has for download. For example, when an App is listed for download in an App store, it may be listed or otherwise associated with the website of the business entity or developer that created the App. Thus, when the Willow App in the example above is provided to the App store, the website www.willow.com may be associated with the App. For example, the App ID associated with the Willow App is stamped to or otherwise associated with the website www.willow.com.

In some embodiments, stamping the URL includes appending, adding or otherwise associating metadata with the URL. In some implementations, the metadata is not viewable by the user but is readable by a database that indexes the applications that are available for download and/or are associated with the various URLs. In some embodiments, the metadata is saved in a database and is subsequently used to determine a relationship between the URLs, the business entities, and/or the developers that created or otherwise own a given application.

Second, the system 100 analyzes the results of the initial web query and determines which results, and how many results, include the absolute URLs that have been stamped as having associated Apps. When the requisite number of URLs are present in the initial search results, the system can and does display the associated Apps.

As described above, in some embodiments, multiple Apps may be associated with a single URL. In such cases, all of the Apps that are associated with the URLs may be provided or otherwise output on a display of the computing device 104. In other cases, Apps that belong to the same or similar categories are provided or otherwise output on the display of the computing device 104.

For example, a search result may include the URL www.willow.com. As described above, this URL may be stamped or otherwise associated with App IDs for two different Apps—Willow Mortgages and Willow Rentals (e.g., the Apps shown in FIG. 2). Each of the Apps is associated with a different category. The Willow Rentals App is associated with a Lifestyle category and the Willow Mortgages App is associated with a Finance category. In some cases, both Apps may be output on the display and available for download as a result of the search. In other cases, the App that is selected for display displayed is the App whose category matches or is associated with the categories of Apps that are related to other URLs that are returned as a result of the search.

For example, the search result may include five different URLs, each of which are stamped with an App ID and as such, have an associated App. If a majority of the Apps have the same category (e.g., Lifestyle) only the Apps with the Lifestyle category will be provided on the display of the computing device. In other cases, multiple categories of Apps may be shown. For example, the top three categories that have the most number of Apps may be displayed.

Figure 3:
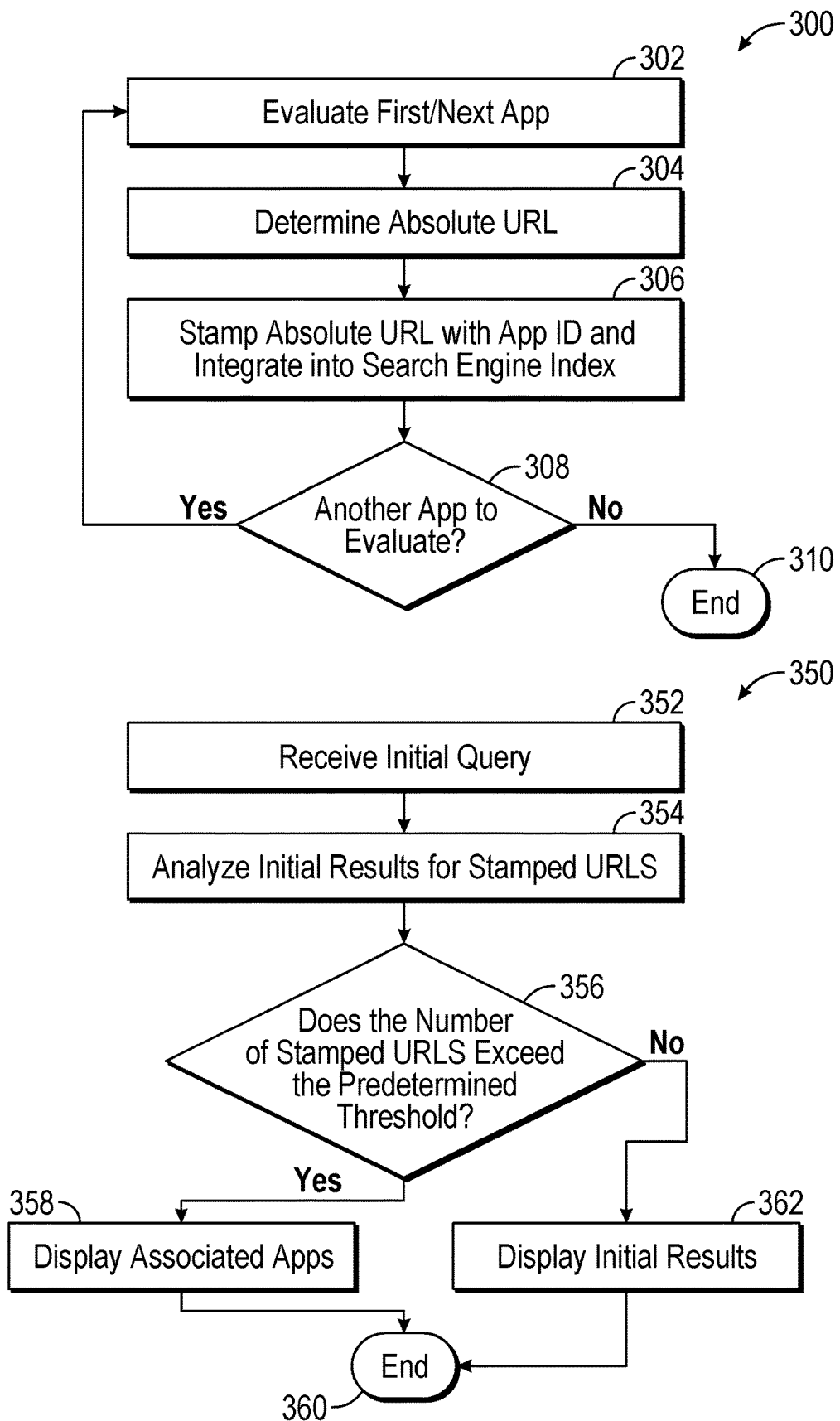
FIG. 3 illustrates both a method for stamping absolute URLs and a method for determining whether to display Apps for download.

FIG. 3 illustrates a method 300 for stamping or otherwise associating a URL with an App ID according to one or more embodiments. The method 30 may be used by the system 100 described above.

Initially, the data store or the App store is prepopulated with Apps that may be downloaded by users at some time in the future. Each of the Apps may be associated with a business entity, developer, individual and so on. Further, the business entity, developer or individual may also have a website with an associated URL.

The system, at 302, initially evaluates the Apps for associated websites. When an associated website is discovered, the website is truncated to identify the absolute URL, at 304. In an embodiment, the absolute URL is extracted from the Developer URL, the Support URL and other such URLs. Since stamping works on absolute URLs, the process generates variants for each URL, e.g., www.willow.com, m.willow.com, and https://willow.com, etc. Once the absolute URL is determined, it is stamped or otherwise identified as having Apps associated with it at stamp operation 306. In an embodiment, the stamp associates the App ID with the URL. If the absolute URL has more than one App associated with it, then the system stamps the URL with a cluster of App IDs.

In an embodiment, once the URLs have been stamped, integrate operation 306 also integrates the information into the search engine index, e.g., the index for the Bing® search engine, which is present on server 114.

Determine operation 308 then determines if there are other Apps to be evaluated. If so then flow branches YES to evaluate operation 302 and the next App is evaluated. If not, then flow branches NO to end operation 310.

Also shown in FIG. 3, is a method 350 for displaying the Apps for download. Method 350 begins at operation 352 when an initial query from a user is received. For example, the query may include the term mortgage. Once the query is received, the results may be determined. For example, websites that include the term mortgage or are otherwise associated with mortgages may be selected for display.

Flow then proceeds to operation 354 and the initial query (e.g., the query for mortgages) is analyzed to determine whether any of the URLs contained in the search results include a stamp or are otherwise associated with an App ID. For example, if the search for mortgages returned the URL of www.willow.com, it may be determined that the URL includes or is otherwise associated with two different App IDs (e.g., App IDs for Willow Mortgages and Willow Rentals such as described in the examples above).

Flow then proceeds to operation 356 and a determination is made as to whether the number of URLs that have been stamped with App IDs or are otherwise associated with one or more Apps and returned in the initial search results exceeds a predetermined number, e.g., a threshold number of URLs. If so, that means the user likely intended to request an App for download and/or would benefit from knowing the available Apps for download.

If the number of URLs with stamped App IDs exceeds the predetermined threshold, then flow branches YES to step 358 and the user is presented Apps for download. In embodiments, the Apps are presented instead of the initial results. In other embodiments, the Apps are presented along with the initial results. In an embodiment, the threshold can be low, e.g., zero, one or two, in order to make sure users get the option to download Apps. In other embodiments, the user may select the threshold number. In yet other embodiments, the number may be high to prevent too many App downloads from being presented. Once presented to the user, then flow ends at 360.

If the number of URLs with stamped App IDs does not exceed the predetermined threshold, then flow branches NO to step 362 and the initial results are displayed for the user and the flow ends at 360.

In certain cases, the URLs that are returned may be associated with or included within different categories. As such, according to certain embodiments for handling such circumstances, the process simply chooses the category of the highest ranked search result having an associated App ID. In another embodiment, the category is chosen based on the majority of the highest ranked search results. For example, if the top ranked search result has an associated App ID for "Finance" but the next three highest ranked search results have App IDs with the category "Lifestyle" then the system chooses "Lifestyle" as the defining category for displaying available Apps.

The above method is especially important when an absolute URL has two or more App IDs associated with it. For example, as shown in FIG. 2, willow.com may have two or more App IDs stamped with the URL, e.g., one for mortgages and one for rentals. The system needs to be able to choose between the two as to which ones are to be presented to the user. By evaluating the context, the system may make this decision in a number of ways. For instance, the system may choose the App ID having the same category as those in other highly ranked search results. In another embodiment, the system may evaluate the search query itself to see if any keywords match with one of the App IDs (e.g., if the query includes the term "mortgage", and if only one of the App IDs has the word mortgage associated with the title, then that App ID can be chosen.) Other embodiments may use other methods of determining which version is best.

Figure 4:
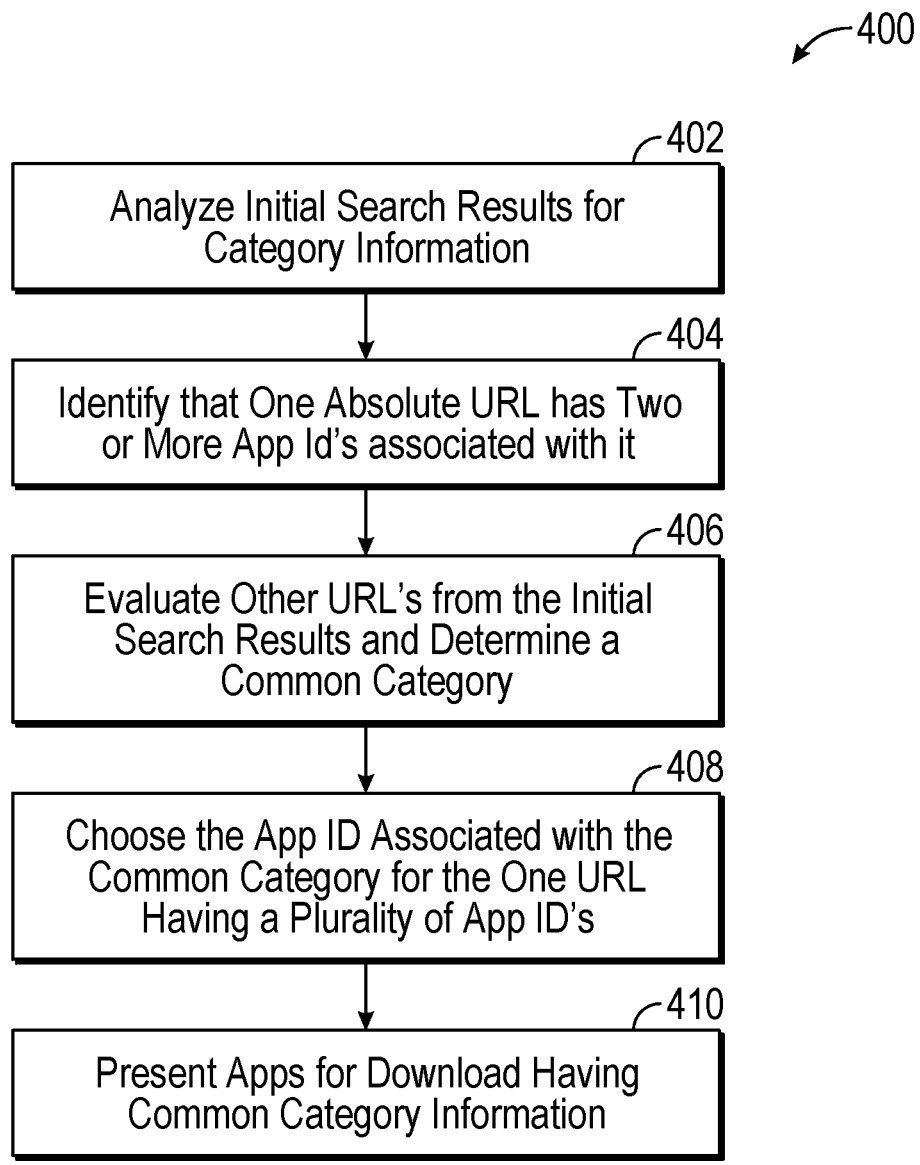
FIG. 4 illustrates a method for handling conflicts between different potential Apps for download.

FIG. 4 illustrates a method 400 for handling the situation where a single URL has two or more App IDs associated with it. In operation 402, initial search results are analyzed for category information. For example, the URLs that are returned in response to a query are analyzed to determine whether they are stamped with one or more App IDs. Additionally, the App that is associated with each App ID may also be analyzed to determine the which category the App is associated with (e.g., Lifestyle, Finance, etc.) In some embodiments, this category information is associated with each App ID stamp.

At operation 404, the process identifies the absolute URL that has two or more App IDs associated with it. Next, at operation 406, the process uses the information regarding categories gleaned at operation 402 to determine a common category. Step 408 then chooses the App IDs out of the initial search results that have the common App ID. In this way, the fact that one of the URLs had two or more App IDs will not create a conflict since only the one with the common category information will be chosen for display. Last, the App information is presented for download to the user at 410.

Figure 5:
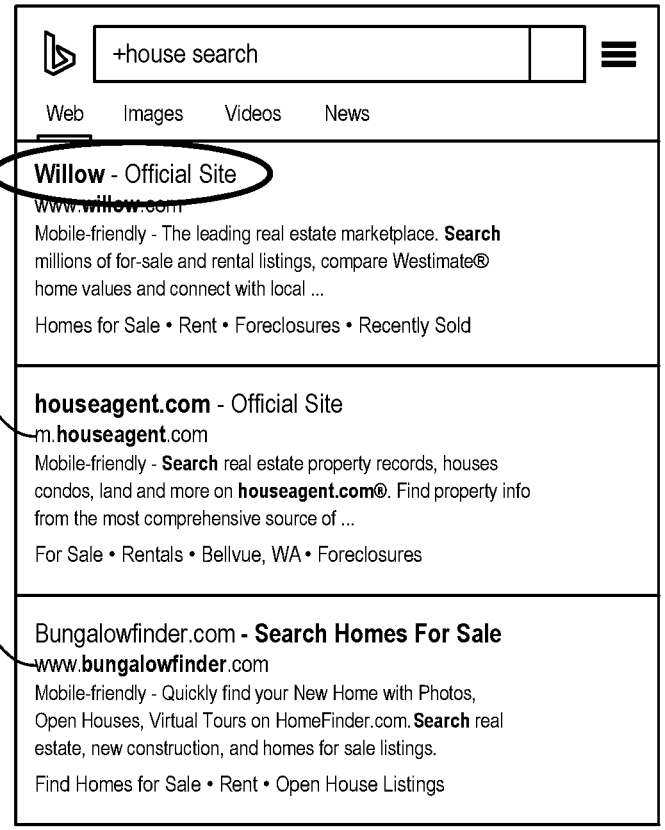
FIG. 5 illustrates example screenshots according to embodiments of the invention.
Figure 5:
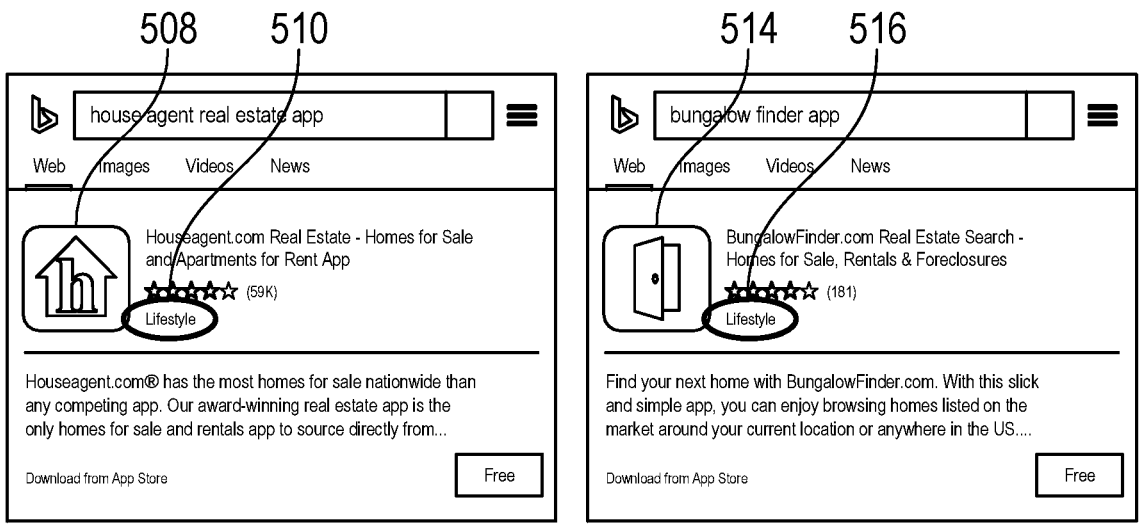

FIG. 5 illustrates an initial search or query into a search engine that further illustrates how one or more Apps can be presented to a user as a result of an implicit App search request. In this example, the search is for "house search". Also shown are the initial results, wherein the results include results from willow.com, houseagent.com and bungalowfinder.com.

As shown in FIG. 2, and discussed above, willow, in this example, has two different Apps associated with it, one App for mortgages and one for rentals. In the above example: the query "House Search", yields multiple web results. In some cases, the web results are stamped with App IDs. For example, www.willow.com is stamped with two App IDs; one being the "Willow Mortgages" App, and the other "Willow Rental" App, since both of them have the same developer website URL. As discussed above, the first App belongs to or is otherwise associated with a "Finance" category and the second App belongs to a "Lifestyle" category.

As shown in FIG. 5, houseagent.com and bungalowfinder.com each have Apps associated with their websites. For instance, m.houseagent.com 506 is stamped with an App ID belonging to "houseagent.com Real Estate" App 508 (which belongs to the Lifestyle category, as shown at 510). Similarly, www.bungalowfinder.com 512 is stamped with an App ID belonging to "bungalowfinder.com Real Estate" App 514 (which belongs also to the Lifestyle category, as shown at 516).

In some cases, all the Apps (e.g., the two from willow and the each of the Apps for houseagent.com and bungalowfinder.com) may be provided on the display for download. In other cases, the App with the highest rating or reviews may be presented for display. In yet other implementations, the category with the greatest number of Apps may be selected and the Apps in that category are displayed. For example, since the Lifestyle category includes three different Apps and the finance category only includes one App, the Apps in the Lifestyle category are presented to the user for download. In yet other implementations, Apps included in categories that have a number of Apps above a threshold number may be output on the display (e.g., categories that have more than Apps). In still yet other cases, all Apps may be provided for display.

As should be appreciated, operations and examples described above, are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

FIGS. 6-9 and the associated descriptions provide a discussion of a variety of operating environments in which aspects of the disclosure may be practiced. However, the devices and systems illustrated and discussed with respect to FIGS. 6-9 are for purposes of example and illustration and are not limiting of a vast number of computing device configurations that may be utilized for practicing aspects of the disclosure, as described herein.

Figure 6:
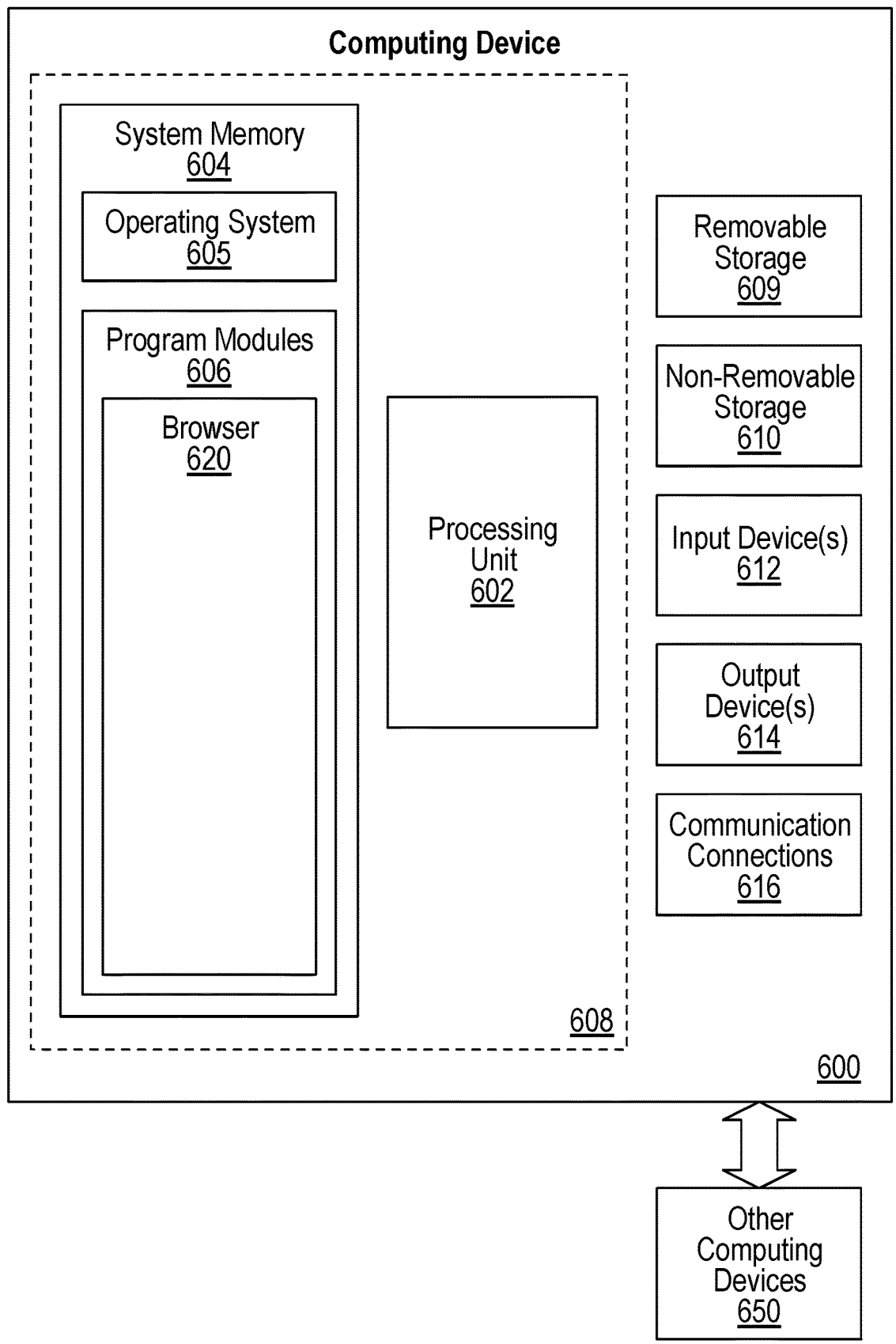
FIG. 6 is a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device components described below may have computer executable instructions for implementing an application browser system on a computing device (e.g., server computing device 114), including computer executable instructions for browser application 620 that can be executed to implement the methods disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running browser 620.

The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., browser 620) may perform processes including, but not limited to, the aspects, as described herein. Other program modules that may be used in accordance with aspects of the present disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
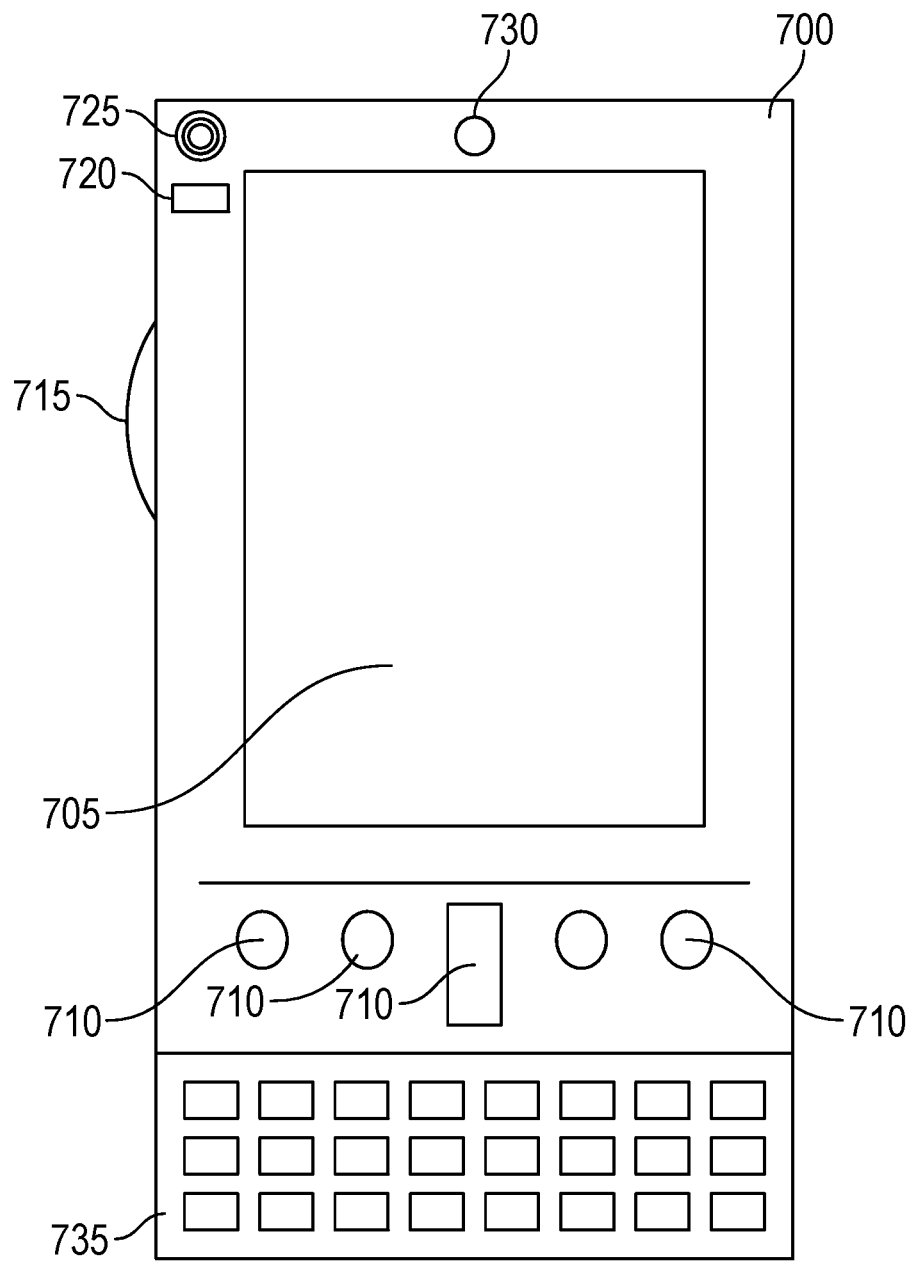
FIGS. 7A and 7B are simplified block diagrams of a mobile computing device with which aspects of the present disclosure may be practiced.
Figure 7B:
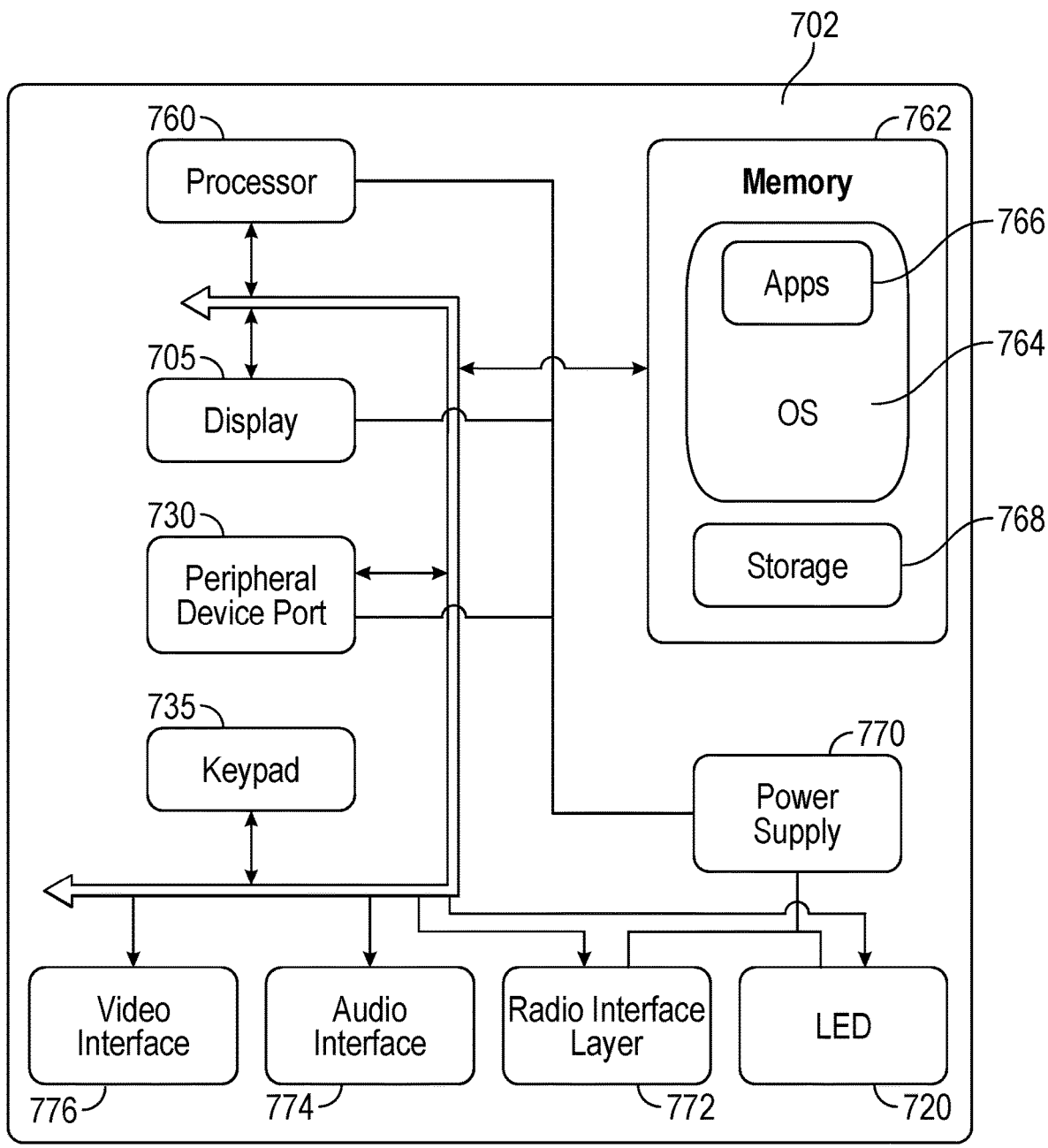

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The Application programs 766 may use and store information in the non-volatile storage area 768. The system 702 has a power supply 770, which may be implemented as one or more batteries. The power supply 770 may further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via an audio transducer 725 (e.g., audio transducer 725 illustrated in FIG. 7A). In the illustrated embodiment, the visual indicator 720 is a light emitting diode (LED) and the audio transducer 725 may be a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of peripheral device 730 (e.g., on-board camera in FIG. 7A) to record still images, video stream, and the like. Audio interface 774, video interface 776, and keyboard 735 may be operated to generate one or more messages as described herein.

A mobile computing device 700 implementing the system 702 may have additional features or functionality. For example, the mobile computing device 700 may also include additional data storage devices (removable and/or non-removable) such as, magnetic disks, optical disks, or tape.

Such additional storage is illustrated in FIG. 7B by the non-volatile storage area 768.

As should be Appreciated, FIGS. 7A and 7B are described for purposes of illustrating the present methods and systems and is not intended to limit the disclosure to a particular sequence of steps or a particular combination of hardware or software components.

Figure 8:
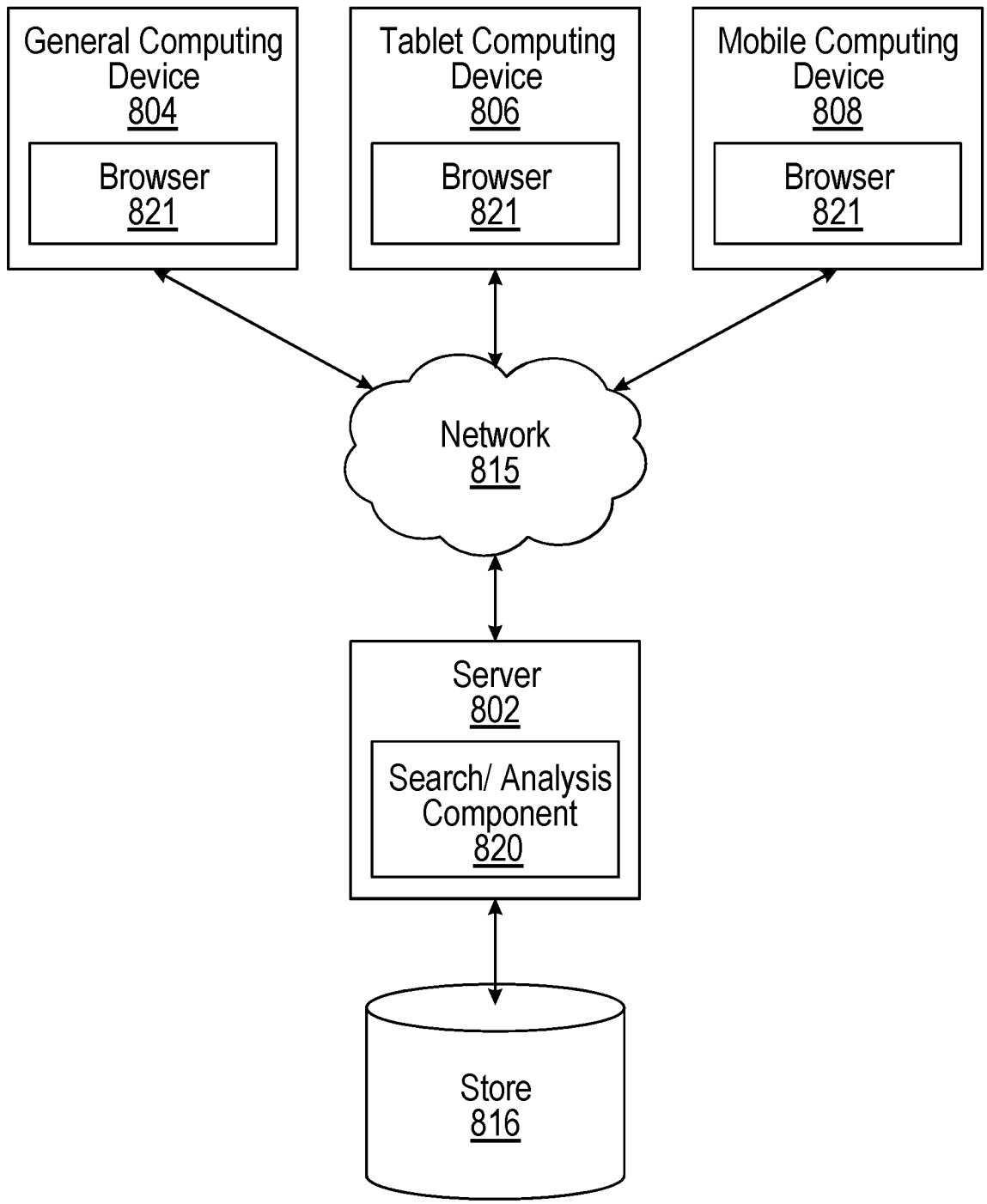
FIG. 8 is a simplified block diagram of a distributed computing system in which aspects of the present disclosure may be practiced.

FIG. 8 illustrates one aspect of the architecture of a system for processing data received at a computing system from a remote source, such as a general computing device 804 (e.g., personal computer), tablet computing device 806, or mobile computing device 808, as described above. Content displayed at server device 802, including the search and analysis component 820, may be stored in different communication channels or other storage types. The server device 802 may provide data to and from a client computing device such as a general computing device 804, a tablet computing device 806 and/or a mobile computing device 808 (e.g., a smart phone) through a network 815 and each respective browser 821. By way of example, the computer system described above with respect to FIGS. 1-5 may be embodied in a general computing device 804 (e.g., personal computer), a tablet computing device 806 and/or a mobile computing device 808 (e.g., a smart phone). Any of these embodiments of the computing devices may obtain content from the store 816, in addition to receiving graphical data useable to either be pre-processed at a graphic-originating system or post-processed at a receiving computing system.

As should be appreciated, FIG. 8 is described for purposes of illustrating the present methods and systems and is not intended to limit the disclosure to a particular sequence of steps or a particular combination of hardware or software components.

Figure 9:
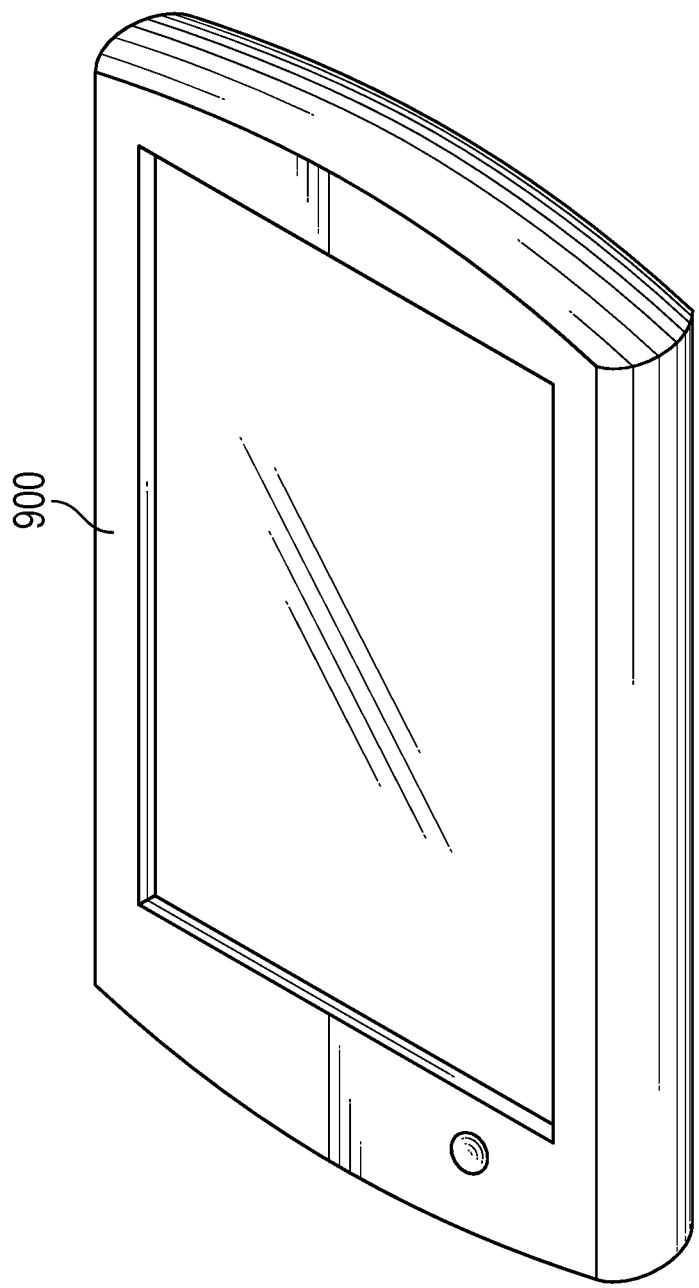
FIG. 9 illustrates a tablet computing device for executing one or more aspects of the present disclosure.

FIG. 9 illustrates an exemplary tablet computing device 900 that may execute one or more aspects disclosed herein. In addition, the aspects and functionalities described herein may operate over distributed systems (e.g., cloud-based computing systems), where Application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 9 is described for purposes of illustrating the present methods and systems and is not intended to limit the disclosure to a particular sequence of steps or a particular combination of hardware or software components.

Examples of the present disclosure are directed to a method for displaying app content associated with one or more apps available for download to a user in response to a query, comprising: receiving a query to obtain initial search results; analyzing the initial search results for app related stamp information; in response to identifying app related stamp information, retrieving app content related to the app related stamp information; and presenting the app content for download. In some examples, the method further comprises identifying app related stamp information for two or more apps related to a particular uniform resource locator; and choosing app content for just one of the two or more apps. In some examples, the particular uniform resource locator is an absolute uniform resource locator. In some examples, the app content is chosen based on the number of apps associated with a particular category. In some examples, the query does not explicitly request the app content. In some examples, the app content is presented when a number of the app content exceeds a threshold.

Also disclosed is a computer-readable storage medium encoding computer executable instructions which, when executed by a processor, performs a method for displaying one or more apps in response to a query, comprising: receiving a query in a user interface; obtaining initial results for the query, wherein the initial results include one or more uniform resource locators that are associated with the query; determining which uniform resource locators are associated with an app identifier; and displaying one or more apps that are identified by the app identifier. In some examples, the uniform resource locator is stamped with the app identifier. In some examples, the instructions further comprise instructions for determining a category associated with the one or more apps. In some examples, displaying the one or more Apps comprising instructions for displaying the apps that are associated with the same category. In some examples, the query is determined to be an implicit request for apps based, at least in part, on the number of app identifiers contained in the initial results. In some examples, the uniform resource locator is an absolute uniform resource locator. In some examples, displaying one or more apps that are identified by the app identifier comprises enabling the one or more apps to be downloaded. In some examples, the one or more apps are displayed in conjunction with the initial results.

In yet other examples, a system is disclosed. The system comprises a processor; and a memory for storing instructions which, when executed by the processor, performs a method for displaying one or more apps in response to an implicit query for apps, comprising: receiving a query; obtaining initial results from the query, the initial results including one or more uniform resource locators associated with a business entity; determining which of the initial results is associated with an app identifier, wherein the app identifier is unique for each app; determining one or more categories associated with the each app; and determining which of the one or more categories includes a greatest number of apps; and presenting the greatest number of apps for download. In some examples, the uniform resource locator is an absolute uniform resource locator. In some examples, the uniform resource locator is associated with two or more app identifiers. In some examples, each of the two or more app identifiers are associated with different categories. In some examples, the query is received in a search engine. In some examples, the greatest number of apps are presented for download only when the greatest number exceeds a threshold amount of apps.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for displaying one or more applications available for download to a user in response to a query, comprising:
   receiving a query;
   obtaining search results for the received query, wherein the search results include at least one website;
   analyzing the search results to identify a uniform resource locator of the at least one website, wherein an app identifier is appended as metadata to the uniform resource locator of the at least one website, wherein the metadata comprising the app identifier is computer readable not user readable, and wherein the app identifier is associated with an application not included in the search results;
   extracting the app identifier from the metadata appended to the uniform resource locator of the at least one website; and
   based on the app identifier, causing the application to be returned as a result for download with the at least one website in the search results.

2. The method of claim 1, further comprising:
   extracting app identifiers for two or more applications from the metadata appended to the uniform resource locator of the at least one website; and
   selecting one of the two or more applications based, at least in part, on other uniform resource locators obtained in the search results.

3. The method of claim 2, wherein the uniform resource locator of the at least one website is an absolute uniform resource locator.

4. The method of claim 1, wherein the query does not explicitly request the application.

5. The method of claim 1, wherein at least the application is presented when a number of identified app identifiers exceeds a threshold.

6. A system, comprising:
   a processor; and
   a memory communicatively coupled to the processor and storing computer executable instructions which, when executed by the processor, cause the system to perform a method for displaying one or more applications in response to a query, comprising:
      receiving a query in a user interface;
      obtaining search results for the query, wherein the search results include at least one website associated with a uniform resource locator;
      analyzing metadata appended to the uniform resource locator of the at least one website to identify an app identifier, wherein the metadata comprising the app identifier is computer readable not user readable, and wherein the app identifier is associated with an application that was not returned in the search results to the query;
      extracting the app identifier from the metadata appended to the uniform resource locator of the at least one website; and
      based on the app identifier, causing the application to be displayed in the search results with the at least one website.

7. The system of claim 6, wherein the uniform resource locator of the at least one website is stamped with the app identifier.

8. The system of claim 6, further comprising instructions for determining a category associated with the application.

9. The system of claim 8, wherein causing the application to be displayed comprises causing applications to be displayed that are associated with the same category.

10. The system of claim 6, wherein the query is determined to be an implicit request for applications based, at least in part, on a number of app identifiers contained in metadata appended to one or more uniform resource locators returned in the search results.

11. The system of claim 6, wherein the uniform resource locator of the at least one website is an absolute uniform resource locator.

12. The system of claim 6, wherein causing the application to be displayed comprises enabling the application to be downloaded.

13. The system of claim 6, wherein the application is displayed in conjunction with the search results.

14. The system of claim 6, wherein the query is not an explicit request for the application.

15. A system, comprising:
    a processor; and
    a memory for storing instructions which, when executed by the processor, perform a method for displaying one or more applications in response to an implicit query for apps, comprising:
       receiving a query;
       obtaining search results for the query, the search results including at least one website associated with a uniform resource locator, wherein the at least one website is associated with a business entity;
       analyzing metadata appended to the uniform resource locator of the at least one website to identify at least one app identifier, wherein the metadata comprising the app identifier is computer readable not user readable, and wherein the at least one app identifier is unique for an application that was not returned in the search results to the query;
       extracting the app identifier from the metadata appended to the uniform resource locator of the at least one website;
       determining a category associated with the application; and
       causing the application and other applications associated with the category to be displayed in the search results with the at least one website.

16. The system of claim 15, wherein the uniform resource locator is an absolute uniform resource locator for the at least one website.

17. The system of claim 15, wherein the metadata appended to the uniform resource locator is associated with two or more app identifiers.

18. The system of claim 17, wherein each of the two or more app identifiers is associated with a different category.

19. The system of claim 18, further comprising:
    determining which of the different categories includes a greatest number of applications, wherein the greatest number of applications are presented for download when the greatest number exceeds a threshold number.

20. The system of claim 15, wherein the query is not an explicit request for an application.

* * * * *